(12) United States Patent
Garg et al.

(10) Patent No.: US 9,858,358 B1
(45) Date of Patent: *Jan. 2, 2018

(54) SESSION-BASED QUERY SUGGESTIONS

(71) Applicant: Google Inc., Mountain View, CA (US)

(72) Inventors: Ashutosh Garg, Sunnyvale, CA (US); Kedar Dhamdhere, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/796,230

(22) Filed: Jul. 10, 2015

Related U.S. Application Data

(63) Continuation of application No. 14/243,269, filed on Apr. 2, 2014, now Pat. No. 9,104,764, which is a continuation of application No. 12/268,844, filed on Nov. 11, 2008, now Pat. No. 8,725,756.

(60) Provisional application No. 60/987,389, filed on Nov. 12, 2007.

(51) Int. Cl.
*G06F 7/00* (2006.01)
*G06F 17/30* (2006.01)

(52) U.S. Cl.
CPC .... *G06F 17/3097* (2013.01); *G06F 17/30395* (2013.01); *G06F 17/30528* (2013.01); *G06F 17/30554* (2013.01); *G06F 17/30867* (2013.01)

(58) Field of Classification Search
CPC ......... G06F 17/30672; G06F 17/30646; G06F 17/30861; G06F 17/3097; G06F 17/30867; G06F 17/30554; G06F 17/30528; G06F 17/30395

USPC ....... 707/706, 739, 767, 776, 759, 765, 768, 707/999.003

See application file for complete search history.

(56) References Cited

U.S. PATENT DOCUMENTS

| | | |
|---|---|---|
| 5,721,902 A | 2/1998 | Schultz |
| 5,926,811 A | 7/1999 | Miller |
| 6,006,225 A | 12/1999 | Bowman |
| 6,169,986 B1 | 1/2001 | Bowman |
| 6,246,977 B1 | 6/2001 | Messerly |
| 6,581,055 B1 | 6/2003 | Ziauddin |
| 7,461,059 B2 | 12/2008 | Richardson |
| 8,285,745 B2 | 10/2012 | Li |
| 8,595,252 B2 | 11/2013 | Wu |
| 2003/0212666 A1 | 11/2003 | Basu |
| 2003/0217052 A1 | 11/2003 | Rubenczyk |
| 2004/0158560 A1 | 8/2004 | Wen |
| 2004/0249808 A1 | 12/2004 | Azzam |
| 2004/0261021 A1 | 12/2004 | Mittal |
| 2005/0091198 A1 | 4/2005 | Dettinger |
| 2006/0085391 A1 | 4/2006 | Turski |
| 2006/0253427 A1 | 11/2006 | Wu |

(Continued)

OTHER PUBLICATIONS

Huang et al., "Relevant Term Suggestion in Interactive Web Search Based on Contextual Information in Query Session Logs," Journal of the American Society for Information Science and Technology, 54(7):638-649, 2003.

*Primary Examiner* — Md. I Uddin
(74) *Attorney, Agent, or Firm* — Fish & Richardson P.C.

(57) ABSTRACT

Methods, systems, and apparatus, including computer program products, in which one or more search query suggestions are made for a current search session. Similar previous search sessions which include search queries common to the current search session are identified. Based upon the similar previous search sessions, one or more suggested search queries are derived and provided to a search engine interface for serving to a user or a client.

18 Claims, 5 Drawing Sheets

(56) References Cited

U.S. PATENT DOCUMENTS

| | | |
|---|---|---|
| 2007/0050393 A1 | 3/2007 | Vogel |
| 2007/0198506 A1 | 8/2007 | Attaran |
| 2007/0203929 A1 | 8/2007 | Bolivar |
| 2008/0154856 A1 | 6/2008 | Riise |
| 2008/0319962 A1 | 12/2008 | Riezler |
| 2009/0006207 A1 | 1/2009 | Datar |
| 2009/0094211 A1 | 4/2009 | Marvit |
| 2009/0106224 A1 | 4/2009 | Roulland |
| 2009/0198672 A1 | 8/2009 | Jones |
| 2009/0222409 A1 | 9/2009 | Peoples |
| 2010/0169353 A1 | 7/2010 | Soetarman |

SESSION-BASED QUERY SUGGESTIONS

CROSS-REFERENCE TO RELATED APPLICATIONS

This application is a continuation application of, and claims priority to, U.S. patent application Ser. No. 14/243,269, filed on Apr. 2, 2014, and titled "Session-Based Query Suggestions," which claims the benefit of priority to U.S. patent application Ser. No. 12/268,844, filed on Nov. 11, 2008, now U.S. Pat. No. 8,725,756, and titled "Session-Based Query Suggestions," which claims the benefit of priority under 35 U.S.C. §119(e) to U.S. Provisional Application Ser. No. 60/987,389, filed on Nov. 12, 2007, and titled "Session-Based Query Suggestions." The disclosure of each of the foregoing applications is incorporated herein by reference.

BACKGROUND

This disclosure relates to providing query suggestions based upon previous queries in a session.

A search engine can allow a user to provide a search query for which search results are returned in response. In some examples, search engines can provide suggestions to the user based upon the search query the user entered. For example, some search engines provide search query suggestions based upon the current search query. However, these suggestions are often ignored because they are based solely upon the popularity of the search queries associated with the current search query.

SUMMARY

This specification describes mechanisms and techniques by which queries of a user search session can be compared to queries of other search sessions to identify query suggestions for presentation during the user search session. In some implementations, a method can include retrieving a series of search queries from a user, the series of search queries comprising a current search session; retrieving a query log comprising previous search queries; associating each of the previous search queries with a respective previous search session; comparing the search queries associated with the current search session and one or more of the previous search sessions; identifying a similarity between the current search session and one or more of the previous search sessions based upon the comparison, wherein a similar previous search session is defined by a set of the series of search queries from the current session matching a subset of the search queries from the previous search session; providing a suggested search query to the user based upon the identification of a similar search session based upon identification of matching search queries associated with the current search session and one or more of the previous search sessions. Other embodiments of this aspect include corresponding systems, apparatus, and computer program products.

Other methods can include receiving a request for a search query suggestion based upon a current search session, the current search session comprising a plurality of search queries; identifying one or more most frequently used follow-up search queries in previous search sessions that used the same search queries as the current search session; and suggesting the one or more most frequently used follow-up search queries to a user associated with the current search session. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations of this disclosure, systems and methods operate to provide session-based search query suggestions. Session-based search query suggestions can identify a query path that a current search session shares with previous search sessions and suggest a search query based upon the previous search sessions including the query path. For example, during a search session, a user might enter a first query followed by a second query. In such an example, a session-based query suggestion can identify previous search sessions that used the first query followed by the second query, and identify a most frequently used query that followed the first and second query in previous sessions that included the first and second queries. Search queries can include multiple query terms, and suggested queries can include subsets of those terms or entirely new terms. For example, a first query might be "San Diego wildfire donations," while a second query might be "California animal rescue." A session-based query suggestion module might suggest searching for "San Diego animal charity."

In other implementations, session-based search suggestions can identify a frequency with which a certain search term ended similar previous search sessions. For example, a search session can include a first and second search query, while similar previous search sessions also include the first and second search query. A session-based suggestion can include one or more most frequent final search queries included in the similar previous search sessions that resulted in the end of the search session. Based upon the inference that the one or more most frequent final search queries are the search queries which most often led to satisfactory results in the similar previous sessions, it is reasonable to infer that such search queries will lead to the satisfactory conclusion of the current search session.

Figure 1:
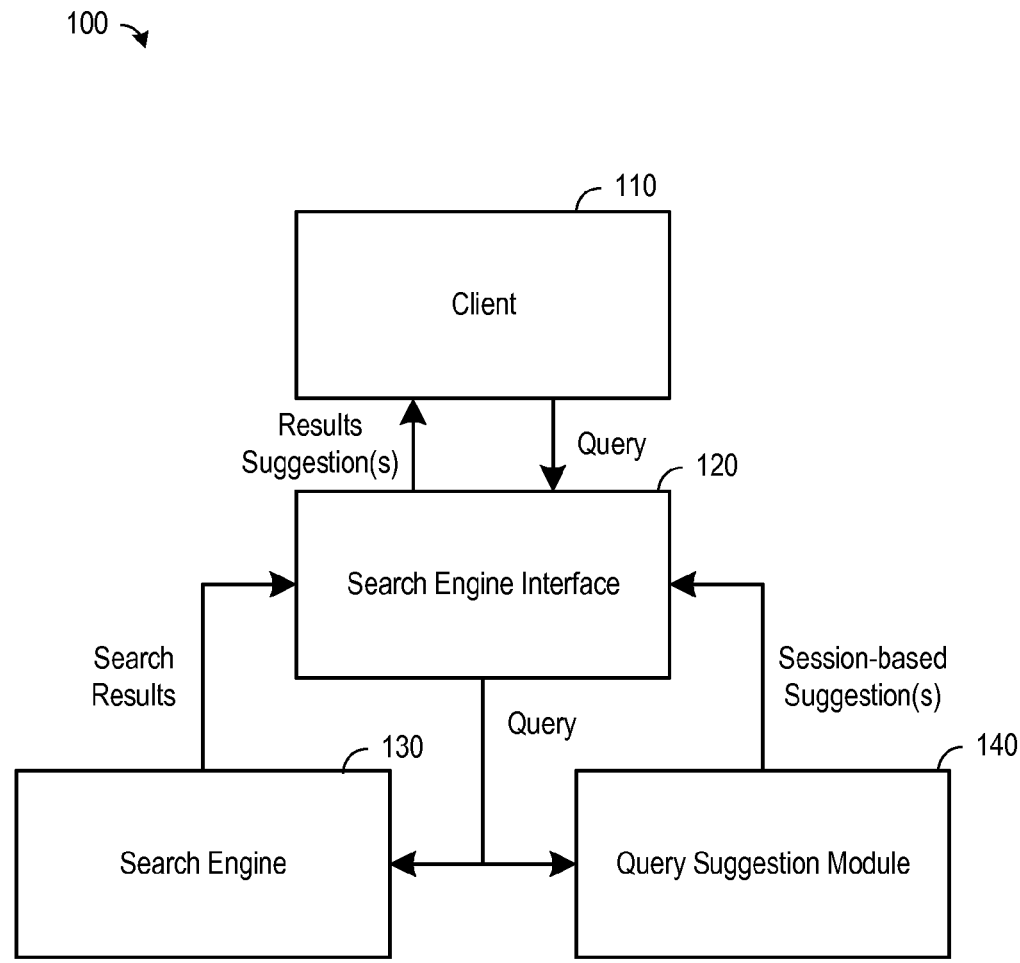
FIG. 1 is a block diagram illustrating an example session-based suggestion system.

FIG. 1 is a block diagram illustrating an example session-based suggestion system 100. The session-based suggestion system 100 can receive input from a client 110. In some implementations, the session-based suggestion system can include a search engine interface 120, a search engine 130 and a suggestion module 140. In some examples, the search engine interface 120 can be a web page operable to be distributed to the client (e.g., a browser). In such examples, the web page can be configured to enable the client to input and submit a search query.

In some implementations, the search engine interface 120 can distribute the received search query to a search engine 130 and a suggestion module 140. In some implementations, the search engine 130 can derive relevance scores associated with the most relevant pages based on the search query. In further implementations, the search engine 130 can derive page rank scores associated with the quality of a web page as measured by the number of other sites linking to a page. The search engine 130 can also derive a score (e.g., an information retrieval (IR) score) related to the search results. In some implementations, IR scores can be computed from, for example, dot products of feature vectors corresponding to a query and a document relevance, page rank scores, and/or combinations of IR scores and page rank scores, etc. Other search engines can also be implemented.

The query suggestion module 140, in some implementations, can receive a search query from the search interface 120 and provide a suggested search query back to the search interface 120. In some implementations, the query suggestion module 140 can provide the suggested search query based upon session data associated with the current search query. For example, if a user has entered a first, second and third query, the query suggestion module 140 can store each of the queries received from the user during the current search session. The query suggestion module 140 can compare the queries from the current search session to previous search sessions to identify similar search sessions. For example, if a previous search session includes each of the search queries included in the current search session, that previous search session can be identified as similar to the current search session.

In some implementations, a search session can be defined by a period of time between queries. For example, if a particular client enters a query, a current search session can be initiated for the particular client. The current search session can be terminated when the search engine has not received further queries from the user for a preset period of time (e.g., 5-10 minutes). In other implementations, the search session can be defined by a user indicating the beginning and end of a search session (e.g., by logging into a search engine interface and logging out of a search engine interface). In still further implementations, the search session can be defined by a relationship between a newly received search query and previously received search queries from the same user. In some examples, a relationship can be identified based upon a current search query including a common search term to a previous search query from the user. In another example, a relationship can be identified based upon similar pages matching previous search results or a topic associated with the previous search queries or results. For example, related search queries might produce similar results. Thus, a previous search query might produce result pages A, B, C and D. A new search query might produce result pages C, E, F and G. These search queries can be identified as related because they result in at least one of the same pages being produced by the search engine. In further implementations, any of the foregoing techniques can be combined to identify whether a new query belongs to a previous session. For example, a new search query, received from an identical user within a threshold time after a previous search query associated with the session has been received, can be compared to previous search queries associated with the session to determine whether a relationship exists between the new search query and the previous search queries associated with the session. If the new query is not related to previous queries from the same user or is not received within a threshold time period, a new session can be initiated.

In some implementations, the current search session can include a set of search queries received during the current session. For example, a set of search queries associated with a current session might include {Q1, Q2, Q5, Q9}. The set of search queries associated with the current session can be compared to sets of previous search sessions. For example, previous search sessions PS1 and PS2 might include the sets PS1={Q7, Q9, Q3, Q8, Q10} and PS2={Q2, Q9, Q5, Q3, Q4, Q5, Q11}. In such an example, the set PS2 can be identified as similar to the current search session based upon the inclusion of at least a subset of search queries from the set of queries associated with the current session.

The query suggestion module 140 can examine similar previous search sessions to identify one or more suggested search queries. In some implementations, the suggested search queries can be independent of the order in which the search queries associated with the current search session are received. For example, a session-based query suggestion module can provide a suggestion based upon similar previous search sessions which include one or more of the search queries associated with the current session. However, these similar previous search sessions might not include the search queries in the same order as the current session. In further implementations, the suggested search queries might include search queries which do not share any search terms with search queries received during the current search session, or might include search queries which include only a portion of the search terms included in search queries received during the current search session. For example, a current search session might include the query Q1="Brand X Computers" and the query Q2="Brand Y Computers." A query suggestion might include "Computer manufacturer reviews." In this example, the query terms "manufacturer" and "reviews" were not part of any search queries associated with the current search session.

The one or more suggested search queries, in some implementations, can be identified based upon a popularity of search queries in the similar previous search sessions which follow the similar search queries included in the current search session. Thus, for example, if a current search session includes a first query, a second search query and a third search query, the similar search queries can also include the first search query, the second search query and the third search query. Moreover, the similar previous search sessions might also include a fourth search query, a fifth search query and a sixth search query. The query suggestion module 140 in such implementations can determine the popularity of each of the fourth, fifth and sixth search queries by identifying how many times those queries were included in the similar search sessions, and dividing the number of times each was included by the total number of similar search sessions. For example, 50 similar previous search sessions might have been identified. Among the 50 search sessions, the fourth query followed the first second and third queries 10 times, the fifth query followed the first, second and third queries 25 times, and the sixth query followed the first, second and third queries 15 times. Thus, the fifth query is the most popular follow-up query to the first, second and third queries, and the sixth query is the second most popular follow-up query, while the fourth query is the third most popular follow-up query.

In other implementations, the query suggestion module 140 can examine all of the search queries received in similar previous search sessions to determine which query modification is the most popular. For example, a current session can include first, second and third search queries. Similar previous sessions also include the first, second and third search queries. However, some similar previous sessions might be longer than four queries. For example, one similar previous search session might include fourth, fifth, sixth and seventh search queries which follow the first, second and third search queries, while another similar previous search session might include only the fifth and seventh search queries in addition to an eight search query and the first, second and third search queries. In such an example, the fifth and seventh search queries can be identified as the most popular based upon the frequency with which those terms appear in the similar previous search sessions following the first, second and third search queries.

In still further implementations, the query suggestion module 140 can identify those search queries included in the similar previous search session to identify which search queries most often led to the conclusion of the similar previous search sessions. Thus, the final search queries in the similar previous search sessions can be identified and the frequency with which each of those final search queries concluded the search can be tabulated and the most frequent can be identified as a suggested search query.

In some implementations, the search queries associated with the current search session might appear in a different order than the search queries associated with similar previous search sessions. For example, a current search session might include only first, second and third search queries, received in the same order. An identified similar previous search session may have begun with two different search queries and then used the first, second and third search queries. In other examples, another identified similar previous search session may have begun with the third search query, then included a fourth search query, followed by the first search query, and concluded with the second search query. Thus, in such implementations, similar previous search sessions can include any previous sessions that include the search queries in any arrangement.

The one or more suggested search queries identified by the query suggestion module 140 can be provided to the search engine interface 120. For example, if the query suggestion module 140 identifies a first suggested search query and a second suggested search query, the query suggestion module 140 can provide both the first and second suggested search queries to the search interface 120.

In some implementations, the search interface can receive the search results for a current search query from the search engine 130 and the suggested search query or queries from the query suggestion module 140. The search engine interface 120 can provide the search results and the suggested search query or queries to the client 110. In some implementations, the search engine interface 120 can combine the search results and the suggested search query or queries together, and can provide the combination to the client 110. For example, the search engine interface 120 can generate a web page with search results received from the search engine 130 and a suggested query or suggested queries received from the query suggestion module 140. The search engine interface 120 can communicate the generated web page to the user for viewing.

In some implementations, the suggested query or queries can be generated as links such that a user can select one of the links through the client using the search engine interface, and a request to perform the search associated with the selected suggested search query can be communicated to the search engine interface. In further implementations, the search results can be linked to the respective web pages that they describe.

Upon the completion of a current search session, the current search session can be stored to a query log for use in deriving future search query suggestions.

The search engine 130 and the query suggestion module 140 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The search engine 130 and the query suggestion module 140 can be implemented separately, or can be implemented as a single software entity. The search engine 130 and the query suggestion module 140 can also be distributively implemented over a network, such as a server farm, or can be implemented in a single computer device.

Figure 2:
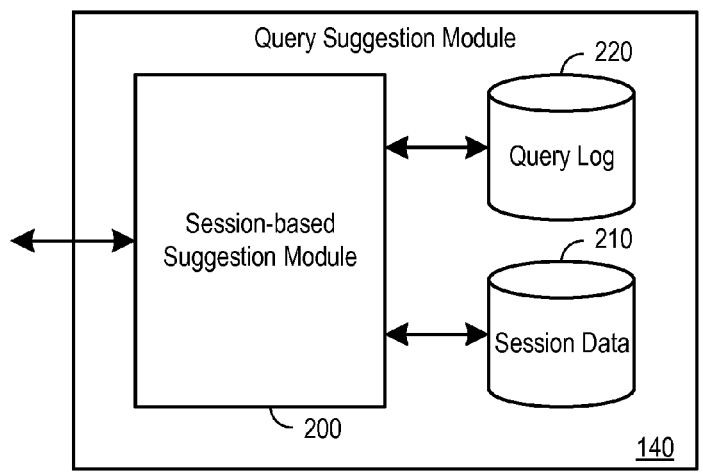
FIG. 2 is a block diagram illustrating an example of a query suggestion module including a session-based suggestion module.

FIG. 2 is a block diagram illustrating an example of a query suggestion module 140 including a session-based suggestion module 200. The session-based suggestion module 200 can receive a current search query from a search engine interface (e.g., search engine interface 120 of FIG. 1). In some implementations, the session-based suggestion module 200 can associate the current search query with a current session and store the result in a session store 210. The session store 210 can store session data associated with the current session and provide current session data to the session-based suggestion module 200.

In some implementations, the session-based suggestion module 200 can retrieve query log information from a query log store 220. If the query log information has not previously been organized by session, the session-based suggestion module 200 can organize the query log information into a number of previous sessions. In other implementations, the query log information can be organized into sessions by the session-based suggestion module 200 as it is stored to the query log.

The session-based suggestion module 200 can identify previous sessions which are similar to the current session-based upon common queries between the sessions. Thus, if the current session includes queries A and B, similar previous sessions would also include queries A and B. The session-based suggestion module 200 can compare queries A and B to the queries of the previous sessions to determine which of the previous sessions include queries A and B.

Previous sessions that include queries A and B can be identified as similar previous sessions and suggested queries can be derived from the similar previous sessions. In some implementations, suggested queries can be based upon an aggregation of search queries that follow queries A and B in the similar previous sessions; and the most often used search queries, following queries A and B in the similar previous sessions, can be identified as suggested queries. In other implementations, suggested queries can be based upon an aggregation of the final queries in the similar previous sessions and the most often used final search queries can be identified as the suggested search queries. Other derivations of suggested search queries based upon the current session can be used.

In some implementations, the session-based suggestion module 200 can compare the derived suggested queries to a suggestion threshold. If the use of a particular search query suggestion falls below the suggestion threshold, it can be inferred that the query has not been used enough times to justify suggesting the search query to the user. In some implementations, the suggestion threshold is a threshold frequency. Thus, if no search query is used significantly more often than other search queries in the similar previous search sessions, it can be inferred that the search sessions are not uniform enough to have a common search query. In other implementations, the suggestion threshold is a numerical threshold, whereby until a specified number of search queries have been identified, the similar previous sessions might not be considered statistically significant. In other implementations, multiple suggestion thresholds (e.g., threshold frequency and a numerical threshold) can be used.

The session-based suggestion module 200 can provide the suggested query or queries to a search engine interface (e.g., search engine interface 120 of FIG. 1). The search engine interface can provide the suggested search query or queries to the user along with the search results for a current search query.

Figure 3:
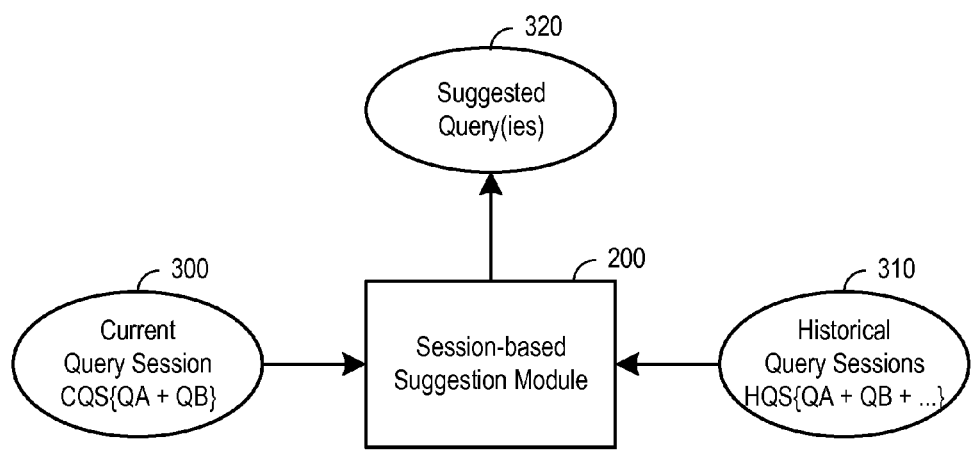
FIG. 3 is a block diagram illustrating an example data flow associated with the session-based suggestion module of FIG. 2.

FIG. 3 is a block diagram illustrating an example data flow associated with the session-based suggestion module 200 of FIG. 2. The session-based suggestion module 200 can receive current session data 300 from a session data store (e.g., session store 210 of FIG. 2). In some implementations, the session-based suggestion module 200 can be responsible for compiling the current session data 300 based upon receiving new search queries from a user associated with previous queries from the user. In some implementations, sessions is identified based upon sequential queries received from the same user. In some implementations, sessions is identified based upon a relationship between queries from the same user. A relationship can be identified based upon the presence of similar terms to prior search queries in the session and/or similar results from prior search queries in the session.

In some examples, the current session data 300 might include query A (QA) and query B (QB). The session-based suggestion module can retrieve historical query sessions 310 that include both query A (QA) and query B (QB), as well as one or more other queries included in the session. The historical query sessions 310 that include both query A (QA) and query B (QB) can be used by the session-based suggestion module 200 to derive one or more query suggestions. In some implementations, the session-based suggestion module 200 derives the query suggestions based upon the most frequently used search queries which follow query A (QA) and query B (QB) in the retrieved sessions 310 or based upon a most frequent final search query associated with the retrieved sessions 310.

The session-based query suggestion module 200 can produce suggested query information 320 based upon the derived query suggestion or suggestions. The suggested query information 320 can be communicated to a search engine interface (e.g., search engine interface 110 of FIG. 1) to be distributed to the user associated with the current query session 300.

Figure 4:
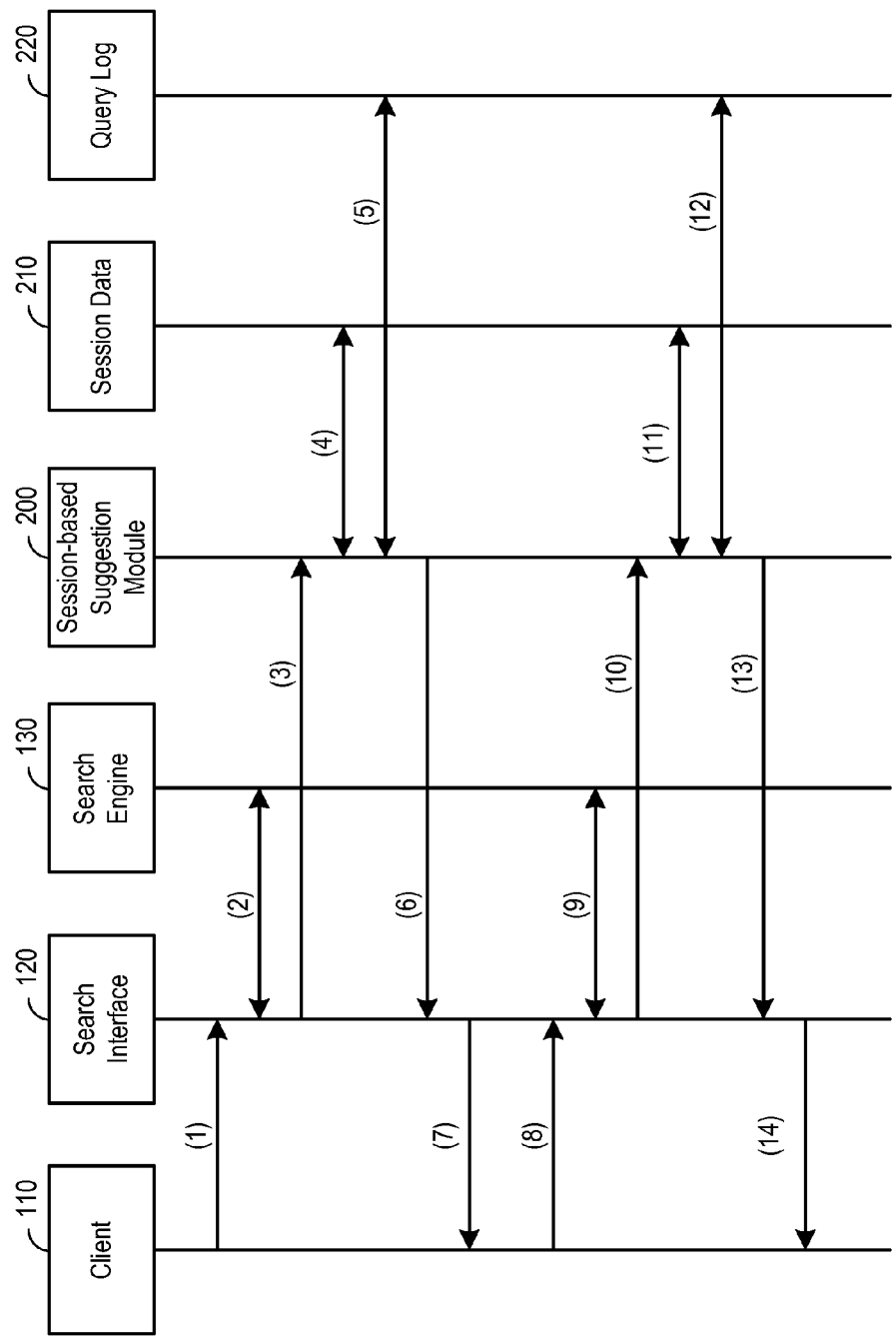
FIG. 4 is a sequence diagram illustrating sequencing of an example session-based suggestion system.

FIG. 4 is a sequence diagram illustrating sequencing of an example session-based suggestion system. A client device 110 sends a current search query to a search engine interface 120 (1). The search engine interface 120 retrieves search results from a search engine 130 (2) and communicates the current search query to a session-based suggestion module 200 (3).

The session-based suggestion module 200 receives session data from a session data store 210 (4) and previous session data from a query log data store 220 (5). In some implementations, the session-based suggestion module 200 retrieves previous session data from the query log data store 220 based upon the session data received from the session data store 210. The session-based suggestion module 200 derives one or more query suggestions based upon the previous session data retrieved from the query log data store 220. In various implementations, the query suggestion or suggestions are based upon a frequency associated with other queries included in the previous session data or based upon queries which concluded the previous sessions associated with the previous session data.

The session-based suggestion module 200 provides the suggestion to the search interface 110 (6). The search interface 110 communicates the search results associated with the current search query and the query suggestion or suggestions to the client 110 (7).

In some scenarios, the client 110 provides a follow-up search query to the search interface 120 (8). The search interface 120 can retrieve search results from a search engine 130 (9) and communicate the new search query to the session-based suggestion module 200 (10). The session-based suggestion module 200 can retrieve previous session data from the session data store 210 (11) and update the session data to include the new search query. The session-based suggestion module 200 can use the updated session data to retrieve previous session data from a query log data store 220 (12).

The session-based suggestion module 200 can then derive one or more suggested search queries based upon the retrieve previous session data. In some implementations, the session-based suggestion module compares the popularity of candidate query suggestions to a threshold. Candidate query suggestions that do not exceed a popularity threshold can be eliminated from consideration for suggesting to a user associated with the current search session. The session-based suggestion module 200 can communicate query suggestion or suggestions to the search interface 120 (13). The search interface 120 thereafter communicates the query suggestion or suggestions and search results to the client 110 (14).

Figure 5:
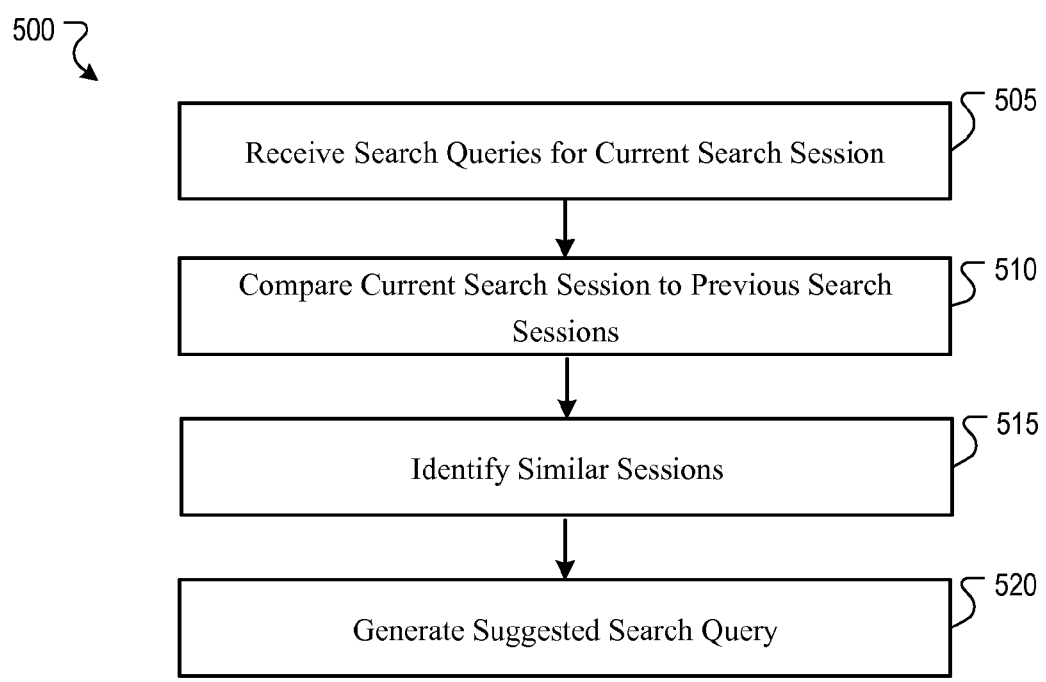
FIG. 5 is a flowchart illustrating an example process for providing session-based suggestions.

FIG. 5 is a flowchart illustrating an example process 500 for providing session-based suggestions. The process 500 receives a current search session (505). The current search session can be received, for example, by a session-based suggestion module (e.g., session-based suggestion module 200 of FIG. 2) in conjunction with a current session data store (e.g., session data store 210 of FIG. 2). The current session can include, for example, a number of search queries that have been entered by a user in a defined time frame. For example, the new search queries can be associated with previous search queries when received within a period of time after the previous search query (e.g., 5-10 minutes). In other examples, a search session can be defined based upon related search queries received from a user. Search queries can be related, for example, by the inclusion of similar or identical search terms and/or search queries resulting in similar results.

The process 500 can compare the current session to previous search sessions (510). The current session can be compared to previous search sessions, for example, by a session-based suggestion module (e.g., session-based suggestion module 200 of FIG. 2) in conjunction with a query log data store (e.g., query log data store 220 of FIG. 2). In some implementations, the query log can include unstructured historical query data. Unprocessed historical query data can be stored at the conclusion of previous search sessions without organizing the search queries into sessions. In other implementations, the query log can include query data which has been sorted into sessions. In further implementations, query log data can be selectively retrieved from the previous search query data based upon the current search session data. In some implementations, the comparison can determine a percentage match between the search queries included in the current search session to previous search queries included in previous sessions.

The process 500 can identify similar previous search sessions (515). Similar previous search sessions can be identified, for example, by a session-based suggestion module (e.g., session-based suggestion module 200 of FIG. 2). In other implementations, similar previous search sessions can be identified by querying a historical query data store (e.g., query log data store 220 of FIG. 2) for previous search sessions that include search queries that match the search queries from the current search session. In some implementations, the session-based suggestion module can identify as similar, those previous search sessions which include all of the search queries included in the current search session. In other implementations, the session-based suggestion module can identify as similar, those previous search sessions which include a threshold percentage match between the search queries of the current search session and the previous search queries included in the previous search sessions.

The process 500 can generate one or more suggested search queries (520). The suggested search query or queries can be provided, for example, by a session-based suggestion module (e.g., session-based suggestion module 200 of FIG. 2) in conjunction with a search interface (e.g., search engine interface 120 of FIG. 2). In some implementations, the suggested search query or queries can include one or more most frequently used search queries in similar previous search sessions. In another implementation, the suggested search query or queries can include one or more most frequently used search queries which concluded similar previous search sessions. Other derivations of suggested search query or queries can also be used.

Figure 6:
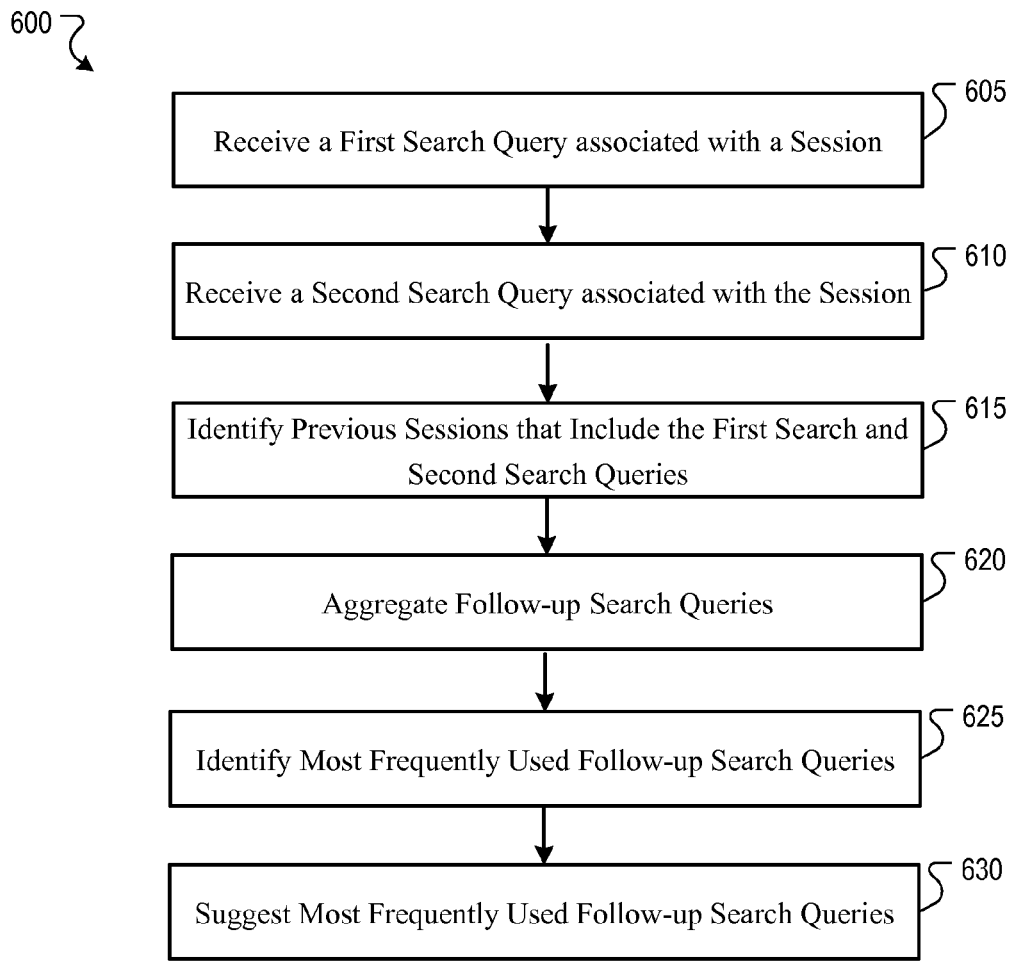
FIG. 6 is a flowchart illustrating another example process for providing session-based suggestions.

FIG. 6 is a flowchart illustrating another example process 600 for providing session-based suggestions. The process 600 can include receiving a first search query associated with a current session (605). The first search query can be received, for example, by a search interface (e.g., search engine interface 120 of FIG. 1). In some scenarios, the first search query initiates the current search session; it is stored to a session data store.

The process 600 can receive a second search query associated with the session (610). The second search query associated with the session can be received, for example, by a search interface (e.g., search engine interface 120 of FIG. 1). The second search query can be associated with the session, for example, by a session-based suggestion module (e.g., session-based suggestion module 200).

The process 600 can identify previous search sessions that include the first and second search queries (615). The previous search sessions that include the first and second search queries can be identified, for example, by a session-based suggestion module (e.g., session-based suggestion module 200 of FIG. 2) in conjunction with previous session data from a data store (e.g., query log data store 220 of FIG. 2). In some implementations, previous search sessions can be required to include the first and second search queries contiguously and in the same order as the current search session. In other implementations, previous search sessions are not required to include the first and second search queries contiguously or in the same order as the current search session.

The process 600 can aggregate follow-up search queries (620). The follow-up search queries can be aggregated, for example, by a session-based suggestion module (e.g., session-based suggestion module 200 of FIG. 2). In some implementations, the follow-up search queries can include those queries immediately following the first and second search queries from the similar previous search sessions. In other implementations, the follow-up search queries can include those queries received at any point after the first and second search queries from the similar previous search sessions. In still further implementations, the follow-up search queries can include those queries which concluded the similar previous search sessions.

The process 600 can identify most frequently used follow-up search queries (625). The most frequently used follow-up search queries can be identified, for example, by a session-based suggestion module (e.g., session-based suggestion module 200 of FIG. 2). In some implementations, the frequency can be compared to a threshold frequency prior to determining whether to suggest the follow-up query to the user associated with the current search session.

The process 600 can suggest the most frequently used follow-up search query or queries (630). The most frequently used follow-up search query or queries can be suggested, for example, by a session-based suggestion module (e.g., session-based suggestion module 200 of FIG. 2) in conjunction with a search interface (e.g., search engine interface 120 of FIG. 1). In some implementations, the suggested search query or queries can be served to a client (e.g., client 110 of FIG. 1) alongside search results for a current search query.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including, by way of example, a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus, the method comprising:
   receiving, during a current search session for a user device, a set of queries;
   identifying, as similar search sessions, multiple previous user search sessions based on a query path that the current search session shares with the similar search sessions, each similar search session including at least a threshold percentage of search queries that match search queries in the set of queries of the current search session;

identifying, as concluding search queries, each search query that concluded at least one of the similar search sessions by being a final search query received during the at least one similar search session;

determining, for each concluding search query, a popularity of the concluding search query based on a total number of the similar search sessions that the concluding search query concluded;

selecting, from the concluding search queries and as a most popular query modification, a given concluding search query in response to (i) the popularity of the given search query being greater than the popularity of each other concluding search query and (ii) the popularity of the given concluding search query being greater than a suggestion threshold; and providing, to the user device, query suggestion data that initiates presentation of the given search query as the most popular query modification associated with the current search session at the user device.

2. The method of claim 1, further comprising providing, to the user device, data that initiates presentation of search results for a particular query of the set of queries with the given search query.

3. The method of claim 1, wherein the similar search sessions are identified from a set of previous search sessions for multiple different users.

4. The method of claim 1, further comprising:
identifying, for each particular search query that is included in at least one similar search session, a number of occurrences of the particular query in the similar search sessions;
selecting at least one of the particular search queries based on the number of occurrences of the at least one particular search query; and
providing, to the user device, data that initiates presentation of the at least one particular search query at the user device.

5. The method of claim 1, further comprising:
identifying, for each particular search query that follows the set of queries in at least one similar search session, a number of search sessions in which the particular search query follows each query in the set of queries;
selecting at least one of the particular search queries based on the number of search sessions in which the at least one particular search query follows each query in the set of queries; and
providing, to the user device, data that initiates presentation of the at least one particular search query at the user device.

6. The method of claim 1, wherein identifying, as similar search sessions, multiple previous search sessions comprises identifying, as the similar search sessions, each previous search session that includes all of the queries of the current search session.

7. The method of claim 1, wherein identifying, as similar search sessions, multiple previous search sessions comprises identifying, as the similar search sessions, each previous search session that includes two or more search queries of the current search session and at least the threshold percentage of the queries of the current search session.

8. The method of claim 1, wherein selecting, from the concluding search queries and as the most popular query modification, a given concluding search query in response to (i) the popularity of given search query being greater than the popularity of each other concluding search query and (ii) the popularity of the given concluding search query being greater than a suggestion threshold comprises selecting the given concluding search query further in response to the given concluding search query not being included in the current search session.

9. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
receiving, during a current search session for a user device, a set of queries;
identifying, as similar search sessions, multiple previous user search sessions based on a query path that the current search session shares with the similar search sessions, each similar search session including at least a threshold percentage of search queries that match search queries in the set of queries of the current search session;
identifying, as concluding search queries, each search query that concluded at least one of the similar search sessions by being a final search query received during the at least one similar search session;
determining, for each concluding search query, a popularity of the concluding search query based on a total number of the similar search sessions that the concluding search query concluded;
selecting, from the concluding search queries and as a most popular query modification, a given concluding search query in response to (i) the popularity of the given search query being greater than the popularity of each other concluding search query and (ii) the popularity of the given concluding search query being greater than a suggestion threshold; and
providing, to the user device, query suggestion data that initiates presentation of the given search query as the most popular query modification associated with the current search session at the user device.

10. The system of claim 9, wherein the operations further comprise providing, to the user device, data that initiates presentation of search results for a given query of the set of queries with the particular search query.

11. The system of claim 9, wherein the similar search sessions are identified from a set of previous search sessions for multiple different users.

12. The system of claim 9, wherein the operations further comprise:
identifying, for each particular search query that is included in at least one similar search session, a number of occurrences of the particular query in the similar search sessions;
selecting at least one of the particular search queries based on the number of occurrences of the at least one particular search query; and
providing, to the user device, data that initiates presentation of the at least one particular search query at the user device.

13. The system of claim 9, wherein the operations further comprise:
identifying, for each particular search query that follows the set of queries in at least one similar search session, a number of search sessions in which the particular search query follows each query in the set of queries;

selecting at least one of the particular search queries based on the number of search sessions in which the at least one particular search query follows each query in the set of queries; and providing, to the user device, data that initiates presentation of the at least one particular search query at the user device.

14. A non-transitory computer storage medium encoded with a computer program, the program comprising instructions that when executed by a data processing apparatus cause the data processing apparatus to perform operations comprising:

receiving, during a current search session for a user device, a set of queries;

identifying, as similar search sessions, multiple previous user search sessions based on a query path that the current search session shares with the similar search sessions, each similar search session including at least a threshold percentage of search queries that match search queries in the set of queries of the current search session;

identifying, as concluding search queries, each search query that concluded at least one of the similar search sessions by being a final search query received during the at least one similar search session;

determining, for each concluding search query, a popularity of the concluding search query based on a total number of the similar search sessions that the concluding search query concluded;

selecting, from the concluding search queries and as a most popular query modification, a given concluding search query in response to (i) the popularity of the given search query being greater than the popularity of each other concluding search query and (ii) the popularity of the given concluding search query being greater than a suggestion threshold; and providing, to the user device, query suggestion data that initiates presentation of the given search query as the most popular query modification associated with the current search session at the user device.

15. The non-transitory computer storage medium of claim 14, wherein the operations further comprise providing, to the user device, data that initiates presentation of search results for a particular query of the set of queries with the given search query.

16. The non-transitory computer storage medium of claim 14, wherein the similar search sessions are identified from a set of previous search sessions for multiple different users.

17. The non-transitory computer storage medium of claim 14, wherein the operations further comprise:

identifying, for each particular search query that is included in at least one similar search session, a number of occurrences of the particular query in the similar search sessions;

selecting at least one of the particular search queries based on the number of occurrences of the at least one particular search query; and providing, to the user device, data that initiates presentation of the at least one particular search query at the user device.

18. The non-transitory computer storage medium of claim 14, wherein the operations further comprise:

identifying, for each particular search query that follows the set of queries in at least one similar search session, a number of search sessions in which the particular search query follows each query in the set of queries;

selecting at least one of the particular search queries based on the number of search sessions in which the at least one particular search query follows each query in the set of queries; and providing, to the user device, data that initiates presentation of the at least one particular search query at the user device.

* * * * *